Nov. 25, 1947.  S. B. SMITH  2,431,590
AUXILIARY CHARGE METERING DEVICE
Filed Dec. 21, 1945  3 Sheets-Sheet 1

INVENTOR.
STANLEY B. SMITH
BY
ATTORNEY

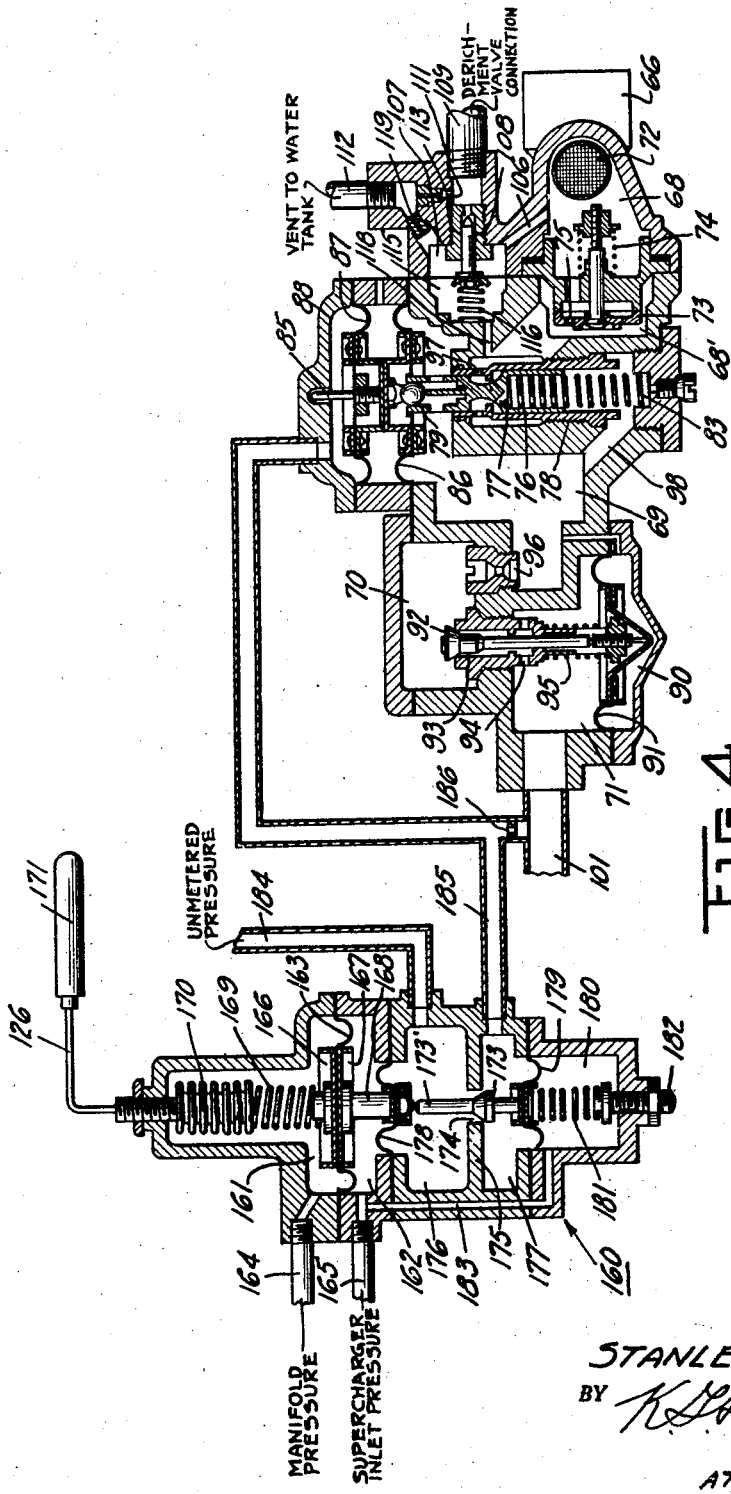

Patented Nov. 25, 1947

2,431,590

UNITED STATES PATENT OFFICE 2,431,590

AUXILIARY CHARGE METERING DEVICE

Stanley B. Smith, South Bend, Ind., assignor to Bendix Aviation Corporation, South Bend, Ind., a corporation of Delaware Application December 21, 1945, Serial No. 636,361

25 Claims. (Cl. 123—119)

This invention relates to an auxiliary charging system for internal combustion engines and other power units to which it may be adapted, and is particularly concerned with the so called "water injection systems" by means of which a suitable auxiliary charge component or medium (which may be water, alcohol, liquid saturated hydrocarbons and like solutions or substances or mixtures thereof) is injected into the normal fuel/air mixture during the charging operation to modify the action of the charge, usually by functioning as a coolant or anti-detonating means. To simplify the following description, the auxiliary charging fluid is generally termed "water," it being understood that this is merely for convenience and that any suitable supplemental anti-detonating fluid may be used.

The present invention may be considered as an improvement on or as an alternate auxiliary charge metering system with respect to that disclosed in the prior application of Stanley B. Smith and Frank C. Mock, Serial No. 533,296, filed April 29, 1944, wherein metering of the auxiliary fluid or water constitutes a function of the fuel metering force or pressure of the fuel flowing to the engine, which pressure is proportional to the air metering force, and consequently water is metered in predetermined proportion to the fuel/air mixture. This will give satisfactory metering of the auxiliary charge through a predetermined power range, but does not necessarily function directly in relation to the pressure rise across the supercharger. In supercharged engines having certain characteristics, water may be metered at a lower rate when the supercharger is in low speed ratio than when in a high or higher speed ratio and still obtain a mixture which will suppress detonation with economy.

An object of the present invention is to provide a water or auxiliary charge metering device which may be easily regulated to produce the most efficient charge mixture for a given manifold absolute pressure.

Another object is to provide a device of the type specified wherein the auxiliary charging fluid may be metered along two or more distinct curves, one for low blower operation and the other or others for high or higher ratios of supercharger-to-engine speeds, to compensate for the temperature rise across the supercharger.

A further object is to provide in a water metering unit of the type disclosed in the above noted application of Stanley B. Smith and Frank C. Mock, Serial No. 533,296 means whereby the metering head across the metering valve may be varied either manually or automatically in relation to the pressure and/or temperature rise across the supercharger.

A further object of the invention is to provide an improved supplemental fluid metering system for engines having a supercharging capacity which may be varied relative to engine speed, such for example as multi-stage, multi-speed, variable speed or other similar supercharging systems.

A still further object is to generally improve water metering systems or units and to adapt the same to engines having different operating characteristics.

The foregoing and other objects and advantages will become apparent in view of the following description taken in conjunction with the drawings, wherein:

Figure 4 is a diagrammatic sectional view of a modified form of water metering unit or system with respect to that shown in Figure 2, the unit in this instance being particularly adapted for variable speed superchargers such as those of the fluid coupling type.

Figure 1:
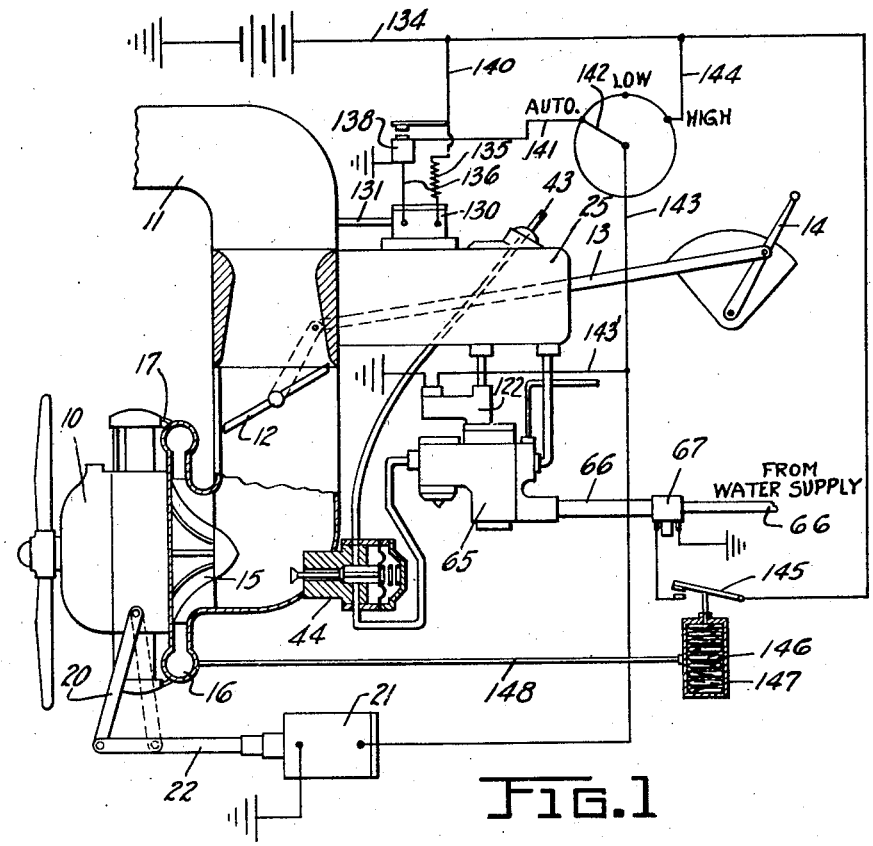
Figure 1 is a diagrammatic representation of an aircraft engine or power plant provided with an auxiliary charging system in accordance with the invention.

Referring to the drawings, and first to Figure 1, an engine 10 has an air-induction conduit 11 provided with a throttle 12, which may be controlled either manually, semi-manually or automatically through linkage 13 leading to a pilot's control lever 14. A supercharger 15 delivers air under pressure to the engine through a supercharger ring or intake manifold 16 which may be connected to the respective engine cylinders by means of conduits 17. The supercharger may be engine-driven and as shown in Figure 1 is of the multi or stepped-speed type, change from one speed to the other being had by means of any conventional transmission or change-speed mechanism provided with a shift lever or control element 20 actuated by means of a supercharger shift solenoid 21 connected to lever 20 by rod or link 22. In the example shown, the solenoid 21 is of the single pole spring-return type, note Figure 3, and as long as the solenoid coil remains unenergized, the supercharger is maintained in low speed gear ratio (full-line position of lever 20), energization of the solenoid causing the latter to move lever 20 to the high speed position indicated in dotted lines.

While only one stage of supercharging is shown, it will be apparent, in view of the teaching of the present invention, that two or more stages may be used with suitable interconnection between any selected one or more of the stages and the water metering selector valve to be described, and also that a variable speed type of supercharger drive may be used such as is obtained by a fluid or hydraulic coupling or by an exhaust gas driven turbine.

Fuel may be supplied to the engine by a carburetor or charge-forming device, generally indicated at 25, of the pressure feed type operating on the air-fuel pressure-differential metering principle, although any carburetor having a source of metering pressure available for pressure communication with the auxiliary charging system may be utilized. A carburetor of this type is disclosed in the copending application of Frank C. Mock, Serial No. 362,572, filed October 12, 1940. Only such parts of the carburetor are herein shown and described as are necessary to an understanding of the present invention.

Figure 2:
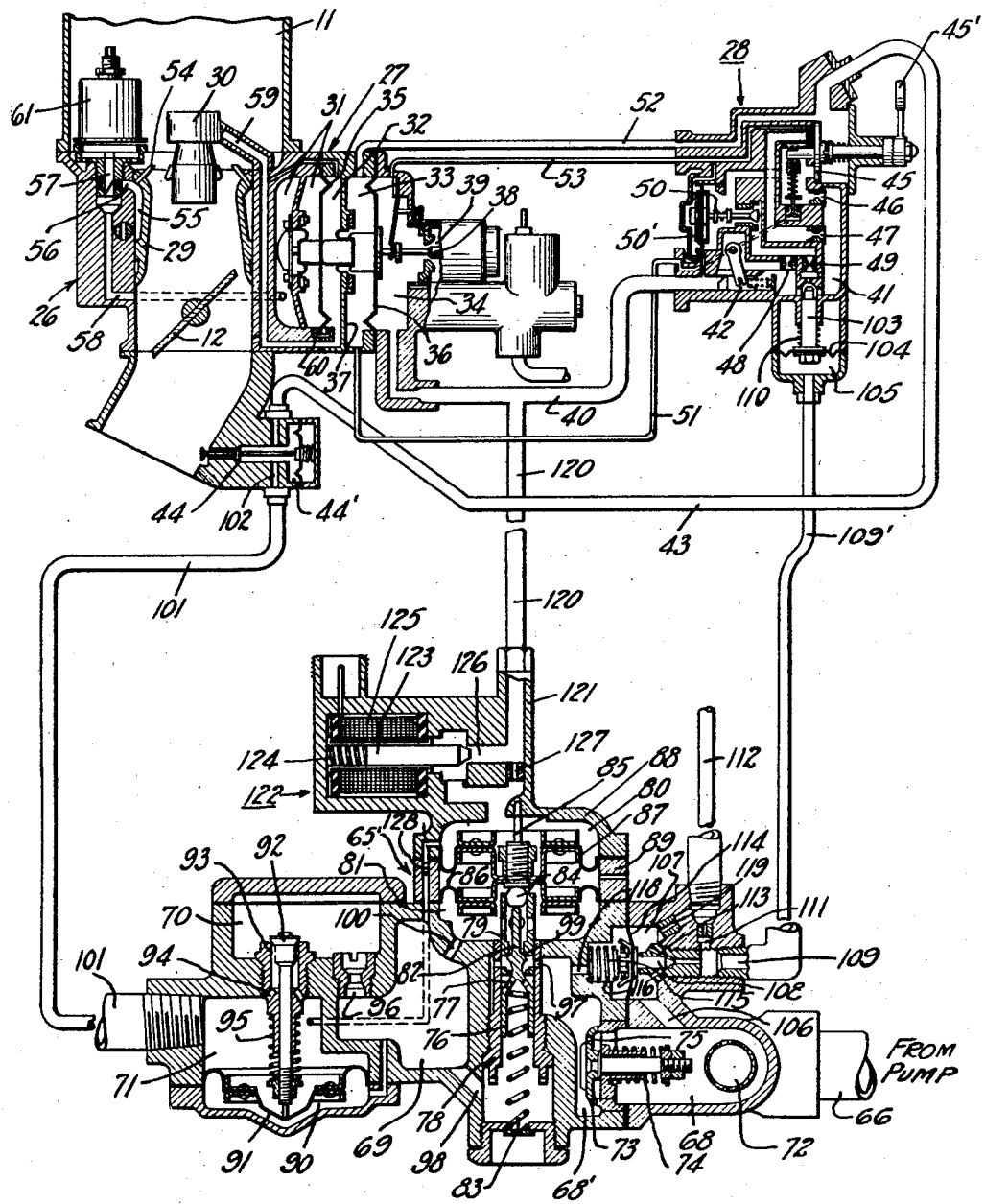
Figure 2 is a diagrammatic sectional view of an engine carburetor and the auxiliary charging device coordinated with the carburetor and relatively enlarged to better show the parts thereof.

Referring to the sectional diagram at the top of Figure 2, the carburetor comprises a main casing or housing made up of an adapter unit 26, a regulator unit 27 and a fuel control unit 28. The adapter 26 is mounted in the air-intake conduit 11 and includes a main venturi 29, a boost venturi 30, and it also mounts the throttle 12. The regulator 27 has a sectional casing connected to the adapter and provided with air pressure-differential chambers 31 and 32 and fuel pressure-differential chambers 33 and 34. Chambers 31 and 32 are separated by a flexible diaphragm 35, and chambers 33 and 34 are separated by a like diaphragm 36. A rigid wall 37 and sealing diaphragm separate chambers 33 and 34. A fuel inlet valve assembly including a poppet valve 38 is adapted to move or reciprocate in relation to the movement of said diaphragms to control a fuel inlet port 39 through which unmetered fuel flows into the chamber 34 and thence through conduit or pipe 40 to chamber 41 of the fuel regulator unit or section 28. A throttle-positioned idle valve 42 meters fuel during idling and thereafter is held in its open position as shown in Figure 2.

From chamber 41 unmetered fuel may flow into the metered fuel section of the fuel regulator and hence by way of pipe or conduit 43 to a discharge nozzle generally indicated at 44, which is spring-pressed toward closed position and opens when the pressure of fuel in diaphragm chamber 44' attains a predetermined value, the particular jet or jets through which metering takes place depending upon the position of a manual mixture control valve 45 provided with a lever 45'; fuel may pass through automatic lean metering jet 46, automatic rich metering jet 47, power enrichment jet 48 and/or power derichment jet 49, the latter being automatically controlled through the auxiliary charging system in a manner to be described. A power enrichment valve, generally indicated at 50, is usually provided in carburetors of this type to give added enrichment automatically, generally in the high power range, said valve being actuated by a diaphragm 50', the movement of which is determined by the differential in pressure between metered and unmetered fuel. Metered fuel pressure is communicated back to chamber 33 by means of ducts 51 and 52, and both chambers 33 and 32 are vented of air or vapor by means of ducts 53 and 52, respectively.

Scoop or air intake pressure is communicated to chamber 31 by means of impact tubes 54, annular chamber 55 surrounding the main venturi 29, passage 56 controlled by needle valve 57, and thence to chamber 31 by way of passage 58. Venturi suction is communicated to chamber 32 by means of a conduit 59. A mixture control bleed 60 leads from the bottom of chamber 31 to chamber 32, said bleed becoming increasingly effective to reduce the differential across the air diaphragm 35 as the pressure in chamber 31 is reduced due to the action of the needle valve 57, the latter being controlled by a density-responsive unit generally indicated at 61 and commonly termed an "automatic mixture control unit."

When the engine is in operation, air is taken into the air scoop or induction conduit 11 and thence through the venturis 30 and 29, and a differential pressure is created between the throat of venturi 29 and the air inlet which, at constant entering air density, is proportional to the square of the quantity of the air flowing. These respective pressures are transmitted to chambers 31 and 32 and create a net force on the diaphragm 35 tending to move the fuel valve 38 to the right, or in a direction to open the valve. If this force were unopposed, the valve would move to the extreme right; however, when the valve opens, fuel under pressure flows into unmetered fuel chamber 34 and to the fuel regulator section 28, where it flows through any one or more of the respective metering orifices and thence through conduit 43 to the discharge nozzle 44, from which it is discharged under a nozzle pressure of, for example, 5 pounds, into the air stream flowing to the engine. Chamber 34 is subjected to unmetered fuel pressure and chamber 33 to metered fuel pressure, and the differential between these respective pressures acts upon the diaphragm 36 tending to move the fuel inlet valve to the left, or in a direction to close the valve, thus opposing the force created on diaphragm 35 by the air-differential pressure. The fuel valve will therefore adjust itself to a point of equilibrium such that the differential pressure across the fuel metering orifices is equal to the differential pressure between the air inlet and venturi, whereby constant fuel/air proportioning is maintained. As engine speed is decreased, the rate of air flow through the venturi is decreased, thereby decreasing the fuel flow to compensate for the decreased rate of air flow. Fuel flow is thus controlled by the rate of air flow.

Since the venturi-to-air-scoop differential pressure increases for a given mass rate of air flow, upon a decrease in entering air pressure, the differential air pressure across diaphragm 35 will tend to increase thereby increasing the fuel flow and richening the mixture. In order to prevent such enrichment with increase in altitude, the calibrated bleed 60 between chambers 31 and 32 is provided, said bleed being automatically ineffective to vary the pressures in these chambers at such times when the needle valve 47 is in open position, as at ground level, but becoming increasingly effective in reducing the pressure in chamber 31 as the density-responsive unit 61 acts to move the needle in a direction to progressively restrict passages 56, 58 with increase in altitude. As a consequence, for any given mass air flow, the needle valve 57 will so restrict passages 56, 58 with variation in altitude that the differential in pressure across diaphragm 35 remains constant notwithstanding that the difference in the pressures between venturi 13 and impact tubes 54 increases with decrease in entering air density. By this means automatic altitude composition is obtained and the richness of the mixture is unaffected by variations in altitude.

The water metering unit is generally indicated at 65 in Figure 1 and is shown in sectional diagram at the bottom of Figure 2. Water or other auxiliary fluid may be conducted to the unit from a suitable supply tank, not shown, through a conduit 66 having therein a pump 67, which may be of conventional construction having an inbuilt by-pass rendered operative when a predetermined pressure is encountered, and is preferably of the electrically driven type. The water pressure regulating and metering unit proper consists of a main compartmented casing or housing 65' provided with a primary intake chamber 68 and secondary intake chamber 68', unmetered water pressure chamber 69, chamber 70 and outlet or discharge chamber 71. A strainer 72 may be installed in chamber 68. Between the chambers 68 and 68' is a valve 73 which opens against the resistance of an adjustable spring 74 and is provided with a small orifice or jet 75 for purposes to be described. This valve may be aptly termed a "derichment timing valve."

Controlling admission of water from the chamber 68' to chamber 69 is a pressure-regulating valve 76 provided with ports 77 and mounted to reciprocate in a pair of aligned lower and upper seat members 78 and 79. This valve 76 is preferably controlled in a manner to maintain the water pressure in the unmetered water chamber 69 equal to the pressure of the unmetered fuel in chamber 80. As here shown, valve 76 is urged towards open position by unmetered gasoline or fuel pressure in fuel diaphragm chamber 80 and towards closed position by the pressure of unmetered water in water diaphragm chamber 81. Accordingly, the valve is provided with a stem 82 urged by a light spring 83 against a ball head 84 engaging in the seat member 79, said head being formed on the lower end of a guide rod 85 constituting part of a diaphragm assembly including a water diaphragm 86 and a fuel diaphragm 87, the outer edges of said diaphragms being connected in sealed relation between a cap 88, separator ring 89 and adjacent portion of the casing 65', and the central portions thereof being clamped between thin, relatively rigid supporting plates reversely contoured and secured on guide rod 85. The diaphragm chamber 80 is placed in pressure communication with the unmetered fuel system of the carburetor body in a manner to be described.

Pressure of the water in chamber 69 is communicated to a diaphragm chamber 90 and acts on a diaphragm 91 which is operatively connected to the stem of an injection control and metering valve 92 mounted in orifice 93, through which metered water flows from chamber 70 and out through ports 94 into chamber 71 when the valve 92 opens against the resistance of adjustable spring 95. A metering jet 96 is located between the chambers 69 and 70. Valve 92 has a specially contoured body coacting with orifice 93 to control metering over the initial portion of the range of auxiliary fluid injection, while jet 96 is adapted to control metering during the remainder of the range, as will be more fully hereinafter described.

Valve seat member 78 is formed with inlet ports 97, and when the water pump starts and valve 73 opens, water passes through these ports and thence down through valve ports 77 and out through flow channel 98 into the chamber 69; and it also passes up through ports 99 and out into diaphragm chamber 81, the latter communicating with chamber 69 by means of flow channel 100.

A conduit 101 conducts metered water from the discharge chamber 71 to a passage 102 formed in the body of the spray nozzle 44, the metered water being thus directed into the liquid fuel and admixed and discharged therewith into the air stream flowing to the engine when the nozzle opens.

Unmetered fuel pressure in the carburetor will always be at a greater pressure by some increment than metered fuel pressure. Thus, if the discharge nozzle 44 is set to deliver at 5 pounds per square inch, the pressure in diaphragm chamber 34 of the carburetor 25 will be 5 pounds plus the air metering force resulting from air flow and Venturi depression, which may, for example, be one-half pound, making a total of 5½ pounds; whereas the pressure in diaphragm chamber 33 will be 5 pounds, or discharge nozzle pressure. The spring 83 acting to seat valve 76 may be so light as to be negligible as far as its effect on the pressure in chamber 69 is concerned, its function being simply to stabilize the action of the valve 76; in effect, it balances the weight of the valve with enough overbalance to insure seating of the valve when the unmetered fuel pressure in chamber 80 is equal to the unmetered water pressure in chamber 81.

The spring 95 for valve 92 may be set to permit this valve to open at a pressure approximating the differential pressure existing in the air diaphragm chambers 31 and 32, or across diaphragm 35, at the beginning of the power or manifold pressure range which calls for water injection, and which differential pressure is proportional to the square of mass air flow to the engine and also fuel flow to the engine.

During operating periods when water is being injected, a leaner fuel/air ratio may be used than would be necessary if no water was being injected. In order to produce this derichment, a fuel derichment valve 103 is provided, said valve controlling the derichment jet 49. This valve has its stem connected to a diaphragm 104 forming a movable wall of chamber 105, which may be placed in pressure communication with water inlet chamber 68 by means of channel 106, chamber 107, valve 108 and conduits 109, 109'. The derichment valve 103 is urged to open position by a spring 110, this being the position it assumes during normal engine operation, or up until the time the water pressure builds up in the chamber 105 sufficiently to close the valve. A bleed 111 communicates chamber 107 and conduit 109 with the top of the water tank, not shown, through pipe line 112.

The valve 108 controls or times the application of water pressure to the pipe or conduit 109 and hence the opening and closing movements of the derichment valve. This valve 108 is mounted in a seat 113 and has its stem connected to a diaphragm 114 forming a partition between chambers 107 and 115, a valve-closing spring 116 being housed in the chamber 115. A port 118 communicates the chamber 115 with the chamber 68'.

When the metering valve 92 opens and metering starts, restriction to flow caused by valve 73 produces a differential across this latter valve which is also applied across diaphragm 114, and when this differential attains such magnitude as will overcome the force of the spring 116, check valve 108 is retracted and water pressure is communicated by way of conduit 109, 109' to chamber 105 and closes derichment valve 103, whereupon less fuel for a given weight of air will be metered to the discharge nozzle. When the water metering valve 92 closes, the pressure on opposite sides of valve 73 equalizes through orifice 75, and when the differential drops to a predetermined value, the check valve 108 seats, and the spring 110 forces the derichment valve open, water pressure in the conduit 109 being relieved back through bleed 111 and conduit 112 to the water tank. A bleed 119 vents chamber 107 to conduit 112.

The construction of the water metering unit so far described is substantially the same as that shown in application Serial No. 533,296 heretofore noted; the present invention residing primarily in means for regulating the water-metering head or pressure in a manner such as to permit selective deviation from a ratio of water-to-fuel giving a predetermined efficient fuel mixture over a portion of the water-injection power range but which ratio may not result in the most efficient mixture over the remainder of said range. The term "efficient fuel mixture" means a ratio of water to fuel which will suppress detonation with maximum fuel and water economy. Thus with the unit disclosed in Serial No. 533,296, once it is set for a predetermined ratio of water to fuel, it will meter along a fixed curve over a given power range, whereas with the present unit, metering may be had along a plurality of curves over a given power range. The means for effecting this result will now be described.

Figure 3:
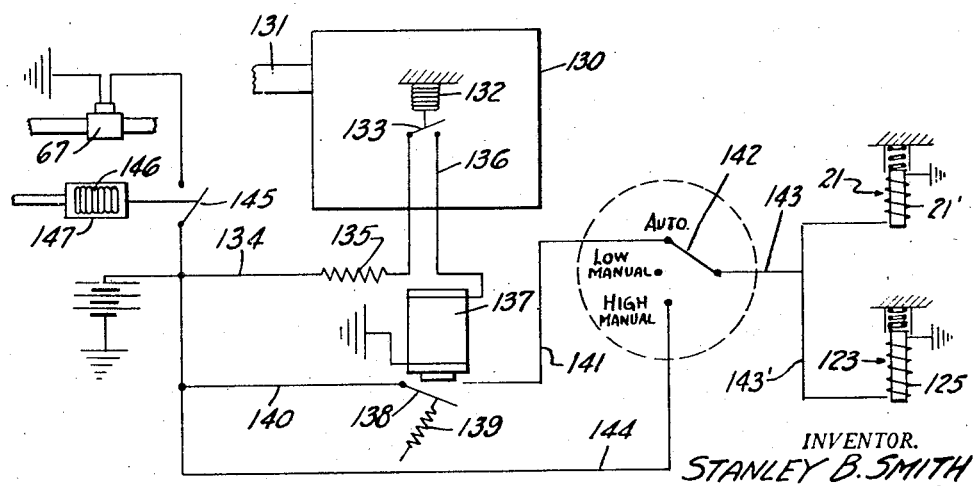
Figure 3 is an electrical diagram of the supercharger shift circuit and coordinated water metering control circuit.

Unmetered fuel pressure is communicated to the diaphragm chamber 80 by means of a conduit 120 which connects with a conduit section 121 forming part of a pressure regulating device generally indicated at 122 and comprising a solenoid valve 123, normally urged to seated position by a spring 124 and retractable through energization of solenoid coil 125, the latter in the example herein illustrated being electrically connected for automatic operation in timed relation with the change-speed mechanism for the supercharger 15, note Figure 3. The valve 123 controls a port 126 adapted to by-pass unmetered fuel around a restricted orifice 127 located in the conduit 121.

A bleed 128 communicates the chamber 80 with the discharge chamber 71, the amount of fuel passing through this bleed being negligible and having little effect on the fuel mixture.

It will be seen that the pressure in chamber 80 will be at a lower value when the solenoid valve is closed than when the latter is open, and the water metering head will be at a corresponding lower value, as will be more fully set forth in the description of operation.

Figure 3 illustrates an automatic supercharger shift or change-speed electrical circuit and co-acting aneroid switch with the solenoid valve 123 interconnected for operation in timed relation therewith. A sealed housing 130 is mounted on the carburetor 25 and communicates with the air-intake conduit 111 through conduit 131; and mounted in this housing is an aneroid switch including a capsule or bellows 132 which controls a switch 133. The capsule 132 may be evacuated to be responsive to changes in pressure only or it may be partially evacuated and charged with a suitable fluid to render it responsive to changes in pressure and temperature and hence changes in density. A supply line 134 connects with one side of the switch 133 through a resistance 135, the opposite side of said switch being connected by line 136 with the solenoid coil 137 of a relay switch 138, which is held in open position when the coil 137 is unenergized by means of a spring 139. One side of the switch 138 connects with the supply line by means of line 140, while the opposite side of said switch 138 is adapted to close the circuit by way of line 141 to a manual selector switch 142. The switch 142 when turned to "automatic" position connects line 141 with the coil 21' of the supercharger shift solenoid 21 and also with the coil 125 of the solenoid valve 123 through lines 143 and 143'.

As long as the manual selector switch 142 is in the position shown, the supercharger will be shifted automatically at a predetermined ram pressure or air density, but by moving said switch to "low," the circuit to the supercharger shift solenoid 21 is broken and the supercharger is maintained in low position; and by turning the said selector switch 142 to "high," the said shift solenoid is directly connected to the supply line through line 144, thereby shifting the supercharger to its high speed ratio.

The water pump 67 may be controlled automatically or manually to start water injection at any predetermined power condition. As here shown, it is controlled automatically by means of a manifold pressure switch 145 connected to a spring-loaded bellows 146 mounted in a closed housing 147, manifold pressure being communicated to the latter by means of conduit 148. When the manifold pressure attains a certain value, for example 67 inches of mercury absolute, the bellows 146 collapses and closes the switch 145, thereby closing the circuit from the supply line to the pump 67.

The auxiliary fluid or water metering system in the form shown in Figures 1 to 3, inclusive, operates as follows:

The conduit 66, chambers 68, 68', 69, 70, 71 and conduit 101 may be considered a continuous flow passage terminating in the fuel discharge nozzle 44. The valve 73 creates and maintains a differential pressure thereacross when the water flow is sufficient to justify derichment of the fuel mixture, the differential being applied across diaphragm 114 to actuate the valve 108 and to control the opening and closing of the derichment valve 103; and the valve 76 controls the water pressure in chamber 69 and is regulated by the differential across the diaphragms 87 and 86 to maintain a predetermined metering head across the metering orifices 96 and 93. The manifold pressure bellows 146 may be set to close the pump switch 145 when the manifold pressure attains a predetermined value, for example, 67 inches Hg. When this switch closes, the pump starts to operate and builds up pressure in chamber 68 and water begins to flow through orifice 75 into chamber 68'. At this time, the pressure in chamber 69 is lower than that existing in the unmetered fuel conduit 40, and as a consequence the valve 76 is open due to the pressure existing in diaphragm chamber 80, and unmetered water flows into chamber 69 and also into the water diaphragm chamber 81 and continues flowing until the pressure in said latter chamber overcomes the unmetered fuel pressure in chamber 80, whereupon the valve 76 closes; this action continuing as one pressure overbalances the other as long as the system is in operation. The system is thus prepared for prompt metering of water to the engine when valve 92 opens in response to the fuel metering differential.

The water in chamber 69 also passes to diaphragm chamber 90 where it acts on the diaphragm 91. The spring 95 of valve 92 is set to maintain valve 92 closed until the differential in the pressures in chambers 69 and 71 attains a predetermined value, whereupon the metering valve 92 opens.

As the valve 92 opens, its movement will be more or less gradual, since the differential pressure in chambers 69 and 71 will gradually overcome the pressure of spring 95, and due to the gradual taper of the body of valve 92, a metering action will take place through orifice 93 which will control metering until the flow through orifice 93 approximates the flow capacity of orifice 96, whereupon the latter becomes the principal metering restriction. Conversely, when the differential pressures in chambers 69 and 71 drop below a given value, valve 92 will close, and during its closing movement, metering will be resumed through orifice 93 until said valve is fully closed.

Metered water in discharge chamber 71 flows by way of line 101 to the nozzle 44, where it is admixed with the metered fuel from the carburetor, and injection begins.

The pressure drop across orifice or jet 75 of the valve 73 determines the pressure differential in chambers 68 and 68', which in turn determines the time of opening and closing of valve 108 and hence the time of closing and opening of the derichment valve 103. When valve 108 opens, the pressure in diaphragm chamber 105 attains a value such that the derichment valve 103 is closed, thereby closing the derichment jet 49. This reduces the richness of the charge and results in a mixture which produces maximum power without detonation and with economy in fuel consumption. In the system as illustrated in Figures 1, 2 and 3, with the solenoid valve 123 interconnected with the supercharger shift circuit, the ratio of water to fuel is such as to produce a predetermined auxiliary charge for low blower operation.

As long as the supercharger is in low blower, with the control lever 20 in the full line position as shown in Figure 1, the valve 123 will be closed and the pressure in diaphragm chamber 80 will produce a metering head such as will give an efficient fuel mixture for the pressure and temperature of the air then flowing to the engine. As long as solenoid valve 123 remains closed, metering of water will be along a lower curve than when said valve is open due to the pressure drop across the restriction 127 in conduit 121. This may be considered the "lean" position of the solenoid valve 123.

Referring to the electrical diagram in Figure 3, in the position of the parts as shown, the supercharger is in low blower and the solenoid coil 125 is unenergized, the spring 124 maintaining the solenoid valve 123 closed. When the air flowing to the engine attains a predetermined density, the bellows or capsule 132 extends to a point where the switch 133 is closed, thereby energizing the relay coil 137 and closing the relay switch 138; whereupon current flows from the main line through lines 140, 141, switch 142, line 143 to the supercharger shift solenoid coil 21' and also to the coil 125 of the solenoid valve 123, the latter being retracted simultaneously with the shifting of the supercharger to its high speed ratio. When this takes place, there is a rise in pressure in diaphragm chamber 80 of the water metering unit, since the drop across the restriction 127 will be nullified, and immediately the metering head across the metering orifice 96 rises and the water is metered at an increased ratio, or along a higher curve.

The increase in metering head, or ratio of water to fuel which takes place when the valve 123 is opened may be varied by varying the relative sizes of the bleeds 127 and 128. Since the pressure of the unmetered fuel will always be at a value greater by a certain increment than the pressure of the water metering head, this gives an operating range for producing a plurality of water-to-fuel ratios.

While the pressure in diaphragm chamber 80 of the water metering unit is produced by a direct connection with unmetered fuel pressure, it will be understood that any pressure which has a constant or fixed value with respect to the air and/or fuel metering force may be used.

Figure 4 illustrates a water metering unit particularly adapted for use with superchargers of the variable speed type, or those wherein the speed is gradually varied through a fluid coupling or other analogous means as contradistinguished from superchargers of the stepped-speed type. The water metering unit proper is similar in construction to that shown in Figure 2, and hence the parts thereof are given similar reference characters. However, the means for adjusting the metering head is different from that shown in the form of the invention illustrated in Figures 1, 2 and 3. A sectional housing, generally indicated at 160 defines a plurality of chambers including a manifold pressure chamber 161 and a supercharger inlet pressure chamber 162, said chambers being separated by a diaphragm 163. A conduit 164 serves to conduct manifold pressure to chamber 161, and another conduit 165 serves to conduct supercharger inlet pressure to the chamber 162. The central portion of the diaphragm 163 is clamped between a pair of reversely dished plates 166 and 167 secured on the one extremity of a stud 168 which is encircled by the adjacent end of a spring 169, the opposite end of the spring being engaged by the movable end of an expansible bellows or capsule 170 which is in pressure communication with a temperature-responsive bulb 171 through tube or conduit 126. The bulb 171 may be located in the supercharger discharge ring 16, Figure 1, or some other point which will register the temperature rise across the supercharger.

A valve 173 controls a port 174 formed in a partition 175 between a pair of chambers 176 and 177. Valve 173 is provided with a stem 173' which at its upper end abuts the lower end of the stud 168, whereby the position of the valve 173 is modified in relation to changes in temperature as sensed by the bellows or capsule 170. A sealing diaphragm 178 is connected to the lower end of the stud 168 and separates chambers 162 and 176; and another similar diaphragm 179 is connected to the lower end of the valve stem 173 and separates the chamber 177 from a chamber 180 in which is mounted a spring 181 normally urging valve 173 toward seated position and adjustable by screw 182. The diaphragms 178 and 179 are of equal effective area and a passage 183 tends to equalize the pressures on the outer sides of said diaphragms and balance out their effect on valve 173.

A conduit 184 serves to communicate unmetered fuel pressure from the carburetor to the chamber 176, said conduit corresponding to the conduit 120 of Figure 2; and another conduit 185 communicates the chamber 177 with the diaphragm chamber 80 of the water metering unit, said latter conduit being in restricted communication with the fuel conduit 101 by means of bleed 186, the latter corresponding in function to the bleed 128 of Figure 2.

As in the form of the invention shown in Figures 1, 2 and 3, the water pump may be provided with a switch set to close when the manifold pressure attains a certain predetermined value. Water metering will then start and proceed as described in connection with the unit of Figure 2 except that in this instance the metering head or pressure in the chamber 80 will vary in direct relation to the temperature and pressure rise across the supercharger. Thus the valve 173 will seek a position as determined by the differential across the diaphragm 173 and which represents the difference in pressure between supercharger inlet pressure and manifold pressure, said differential being influenced or modified by the temperature-responsive bellows 170 acting through the spring 169. In other words, valve 173 will regulate the metering head across the metering orifice 93 and 96 in a manner such as to meter water in proportion to the pressure rise across the supercharger with correction for supercharger inlet air temperature.

Screw 182 may be adjusted to vary the effective travel of valve 173 and thereby adjust the temperature and pressure differential vs. metering head relationship.

While the metered water is shown as being conducted to a nozzle common to both fuel and water, it will be obvious that it could be conducted to a separate nozzle or discharge outlet and subsequently admixed with the fuel charge.

The foregoing and other modifications and rearrangements of parts in the auxiliary metering systems herein disclosed will be apparent to those skilled in the art, and it should therefore be understood that the invention is not limited to the particular structure used for the purposes of illustration.

I claim:

1. For use with a supercharged engine having an air-induction passage and means for metering a primary fuel to the engine under pressure, an auxiliary charge injection system for supplying an auxiliary charging fluid to the engine including a flow passage having metering means therein, and means for regulating the metering head across said auxiliary charge metering means as a function of a primary fuel metering pressure modified by a pressure derived from the supercharger.

2. For use with an engine having an air-induction passage provided with a variable speed supercharger and means for metering a primary fuel to the engine under pressure, an auxiliary charge supply system for supplying an auxiliary charging fluid to the engine including a flow passage having metering means therein, and means for regulating the metering head across said metering means as a function of a primary fuel metering pressure modified by a pressure varying with changes in supercharger speed.

3. For use with a supercharged engine having an air-induction passage and means for metering a primary fuel to the engine under pressure, an auxiliary charge injection system including a flow passage having metering means therein, means for regulating the metering head across said auxiliary charge metering means as a function of the metering head across said primary fuel metering means, and means responsive to changes in density of the air flowing to the engine for modifying the action of said regulating means.

4. For use with an engine having an air-induction passage provided with a variable speed supercharger and means for supplying a primary fuel to the engine, an auxiliary charge injection system for supplying an auxiliary charging fluid to the primary fuel including a flow passage having metering means therein, a valve controlling the metering head across said metering means, means operating as a function of the air and/or fuel flow to the engine for regulating said valve, and means operative in response to changes in pressure of the air in said induction passage for modifying the action of said valve-regulating means.

5. For use with an engine having an air-induction passage provided with a variable output supercharger and means for supplying a primary fuel to the engine under pressure, an auxiliary charge injection system for supplying an auxiliary charging fluid to the primary fuel including a flow passage having metering means therein, a valve for regulating the metering head across said metering means, means responsive to variations in pressure of the unmetered primary fuel for regulating said valve, and means operative in response to changes in pressure of the air in said induction passage for modifying the action of said pressure-responsive means.

6. For use with an engine having an air induction passage provided with an intake manifold and a multi-speed supercharger and means for supplying a primary fuel to the engine, an auxiliary charge injection system for supplying an auxiliary charging fluid to the engine over a given range of manifold pressures including a flow passage having metering means therein, means for regulating said metering means to meter the auxiliary fluid at a relatively lean ratio with respect to the primary fuel over a portion of said range, and means operative upon a change in speed of the supercharger relative to the speed of the engine to effect metering of said auxiliary fluid at a richer ratio over another portion of said range.

7. For use with an engine having an air induction passage provided with an intake manifold and a multi-speed supercharger having a control element for changing the supercharger to engine speed ratio and means for supplying a primary fuel to the engine, an auxiliary fluid supply system for supplying an auxiliary charging fluid to the engine over a given range of manifold pressures including a flow passage having metering means therein, means for regulating said metering means to meter the auxiliary fluid at a relatively lean ratio with respect to the primary fuel over a portion of said range, and means connected to said element for operation upon a change in speed of the supercharger for modifying the action of said regulating means to effect a richer ratio over another portion of said range.

8. For use with an engine having an air induction passage provided with an intake manifold and a multi-speed supercharger having a control element for changing the speed thereof and means for supplying a primary fuel to the engine, an auxiliary charge injection system for supporting an auxiliary charging fluid to the engine over a given range of manifold pressures including a flow passage having metering means therein, means for regulating said metering means to meter the auxiliary fluid at a given ratio to the primary fuel over a portion of said range, and means operatively interconnecting said control element and said regulating means whereby upon a change in speed of the supercharger the auxiliary fuel will be metered at a different ratio over another portion of said range.

9. For use with an engine having an air induction passage provided with an intake manifold and a multi-speed supercharger provided with a change speed mechanism and means for metering a primary fuel to the engine under pressure, an auxiliary charge injection system for supplying an auxiliary charging fluid to the primary fuel including a flow passage having metering means therein, a valve for regulating the metering head across said metering means, means operating as a function of the primary metering means for regulating said valve, and means operative upon a change in speed of said supercharger for modifying the action of said valve regulating means.

10. For use with a supercharged engine having an air induction passage provided with an intake manifold and means for metering a primary fuel to the engine, said supercharger being of the mult-speed type and provided with change speed mechanism and a control element therefor; an auxiliary fluid supply system for supplying an auxiliary charging fluid to the engine including a flow passage having metering means therein, a valve for regulating the metering head across said metering means, means operating as a function of the head across the primary fuel metering means for regulating said valve, power means for actuating said control element, means responsive to changes in pressure of the air flowing to the engine controlling said power means, and means operatively interconnecting said controlling means with said valve regulating means to modify the action of the latter upon a change in speed of the supercharger.

11. For use with an engine having an air induction passage provided with a supercharger and means for supplying a primary fuel to the engine, said supercharger being of the multi-speed type and provided with a change speed mechanism and a control element therefor together with power means for operating said control element and means responsive to changes in the density of the air flowing to the engine for automatically operating said power means; an auxiliary fluid supply system for supplying an auxiliary fluid to the engine including a flow passage having metering means therein, and means operatively interconnecting said power means with said metering means for modifying the action of the latter upon a change in speed of the supercharger.

12. For use with an engine having an air-induction passage provided with an intake manifold and a supercharger and means for metering a primary fuel to the engine under pressure, said supercharger being of the multi-speed type having change-speed mechanism and a control element therefor; an auxiliary charge injection system for supplying an auxiliary charging fluid to the primary fuel including a flow passage having metering means therein and a valve for regulating the metering head across said metering means, pressure-responsive means operatively connected to said regulating valve, means for subjecting said pressure-responsive means to a pressure variable with variations in the metering pressure of the primary fuel, means for modifying said variable pressure, and means operatively interconnecting said control element and said modifying means whereby upon a change in speed of the supercharger the metering head is automatically varied in relation to the pressure rise across the supercharger.

13. For use with an engine having means for metering a primary fuel to the engine under pressure, an auxiliary charge injection system for supplying an auxiliary charging fluid to the primary fuel including a flow passage having metering means therein and a valve for regulating the metering head across said metering means, pressure-responsive means operatively connected to said regulating valve, means for subjecting said latter means to a fluid pressure variable in relation to variations in pressure of the primary fuel metering force, and means for selectively varying said fluid pressure to obtain different ratios of auxiliary fluid to primary fuel.

14. For use with an engine having means for metering a primary fuel to the engine under pressure, an auxiliary charge injection system for supplying an auxiliary charging fluid to the primary fuel including a flow passage having metering means therein and a valve for regulating the metering head across said metering means, pressure-responsive means operatively connected to said regulating valve, means for subjecting said pressure-responsive means to unmetered fuel pressure including a conduit having a restriction therein and a by-pass around said restriction, a valve controlling said by-pass and means for operating said by-pass valve.

15. For use with an engine having an air-induction passage provided with an intake manifold and a supercharger and means for metering a primary fuel to the engine under pressure, said supercharger being of the multi-speed type having change speed mechanism and a control element therefor; an auxiliary charge injection system for supplying auxiliary charging fluid to the primary fuel including a flow passage having metering means therein and a valve for regulating the metering head across said metering means, a diaphragm or analogous pressure-responsive means operatively connected to said regulating valve, means for subjecting said regulating valve to a differential in pressure between unmetered fuel pressure and unmetered auxiliary fluid pressure including a conduit having a restriction therein, a by-pass around said restriction and a valve controlling said by-pass, and means operatively interconnecting said by-pass valve and said control element.

16. For use with an engine having an air-fuel intake system including means for metering a primary fuel under pressure to the engine, an auxiliary charge injection system for metering an auxiliary charging fluid to the engine including a chamber for unmetered auxiliary fluid, a valve controlling admission of said fluid to said chamber, means responsive to a function of the air-fuel intake system controlling said valve to maintain the unmetered auxiliary charging fluid in said chamber at a pressure higher by a certain constant value than the pressure of the metered primary fuel, another valve in series with said first-named valve controlling admission of the auxiliary charging fluid to the metered primary fuel, metering means associated with said second-named valve and rendered operative upon opening of the valve, means responsive to the pressure of the unmetered auxiliary charging fluid controlling said last-named valve, and means for selectively varying said unmetered fluid pressure.

17. For use with an engine having an air-fuel intake system including means for metering a primary fuel under pressure to the engine, an auxiliary charge injection system for metering an auxiliary charging fluid to the engine including a chamber for unmetered auxiliary fluid, a valve controlling admission of said fluid to said chamber, means responsive to a function of the air-fuel intake system controlling said valve to maintain the metering head of the auxiliary charging fluid at a certain constant value with respect to that of the metered primary fuel, said last-named means including a diaphragm or analogous pressure-responsive device operatively connected to said valve and a flow passage for communicating fluid under pressure from the primary fuel metering system to said diaphragm having a flow-restriction therein, a by-pass around said restriction and a valve controlling said by-pass, opening of said by-pass increasing the pressure on said diaphragm to thereby increase the metering head of the auxiliary charging fluid, and means responsive to an engine condition for automatically actuating said valve.

18. For use with an engine having an air-fuel intake system including means for metering a primary fuel under pressure to the engine, an auxiliary charge injection system for metering an auxiliary charging fluid to the engine including a chamber for unmetered auxiliary fluid, a valve controlling admission of fluid to said chamber, means responsive to a function of the air-fuel intake system controlling said valve to maintain the metering head of the auxiliary charging fluid at a certain constant value with respect to that of the metered primary fuel, said last-named means including a diaphragm or analogous pressure-responsive device in pressure-communication with said chamber and operatively connected to said valve and a flow passage for communicating fluid under pressure from the primary fuel metering system to said diaphragm having a flow restriction therein, a by-pass around said restriction and a valve controlling said by-pass, means for bleeding fluid from said chamber, opening of said by-pass increasing the pressure on said diaphragm to thereby increase the metering head of the auxiliary charging fluid, and means responsive to an engine condition for automatically actuating said valve.

19. For use with an engine having an air-fuel intake system including an intake manifold and means for metering a primary fuel under pressure to the engine, an auxiliary charge injection system for metering an auxiliary charging fluid to the engine including a flow passage having metering means therein, a valve controlling admission of said fluid to said passage upstream of said metering means, means responsive to a function of the air-fuel intake system controlling said valve to maintain the metering head of the auxiliary charging fluid at a certain constant value with respect to that of the metered primary fuel, said last-named means including a diaphragm or analogous pressure-responsive device in pressure-communication with the unmetered auxiliary charging fluid and operatively connected to said valve and a conduit for communicating fluid under pressure from the primary fuel metering system to said diaphragm having a flow restriction therein, said metering means being rendered operative upon opening of the valve, a bleed communicating said conduit posterior said restriction with said flow passage posterior said metering means, and means responsive to intake manifold pressure for automatically actuating said valve.

20. For use with an engine having an air-intake system including a supercharger of the change-speed type provided with a speed control element and means for metering a primary fuel under pressure to the engine, an auxiliary charge injection system for metering an auxiliary charging fluid to the engine including a flow passage having therein a chamber for unmetered auxiliary fluid, a valve controlling admission of fluid to said chamber, means responsive to a function of the air-fuel intake system controlling said valve to maintain the metering head of the auxiliary charging fluid at a certain constant value with respect to that of the metered primary fuel, said last-named means including a diaphragm or analogous pressure-responsive device in pressure-communication with said chamber and operatively connected to said valve and a conduit for communicating fluid under pressure from the primary fuel metering system to said diaphragm having a flow restriction therein, a by-pass around said restriction and an electrically operated valve controlling said by-pass, metering means in said flow passage rendered operative upon opening of the valve, means for bleeding a constant quantity of fuel from said chamber to said flow passage posterior said metering means, opening of said by-pass increasing the pressure on said diaphragm to thereby increase the metering head of the auxiliary charging fluid, and an electrical circuit operatively connecting said valve with said control element whereby the valve is actuated upon a change in speed of the supercharger.

21. For use with an engine having an air induction passage provided with a variable speed superchager and means for metering a primary fuel to the engine under pressure; an auxiliary charge injection system for metering an auxiliary charging fluid to the engine including a flow passage having metering means therein and a valve for regulating the metering head across said metering means, a diaphragm or analogous pressure-responsive device operatively connected to said regulating valve, means for communicating fluid under pressure from the primary fuel metering system to said diaphragm including a flow conduit and a valve controlling the flow of fluid through said conduit, and means responsive to the pressure rise across the supercharger controlling said latter valve.

22. For use with an engine having an air induction passage provided with a variable speed supercharger and means for metering a primary fuel to the engine under pressure; an auxiliary charge injection system for metering an auxiliary charging fluid to the engine including a flow passage having metering means therein and a valve for regulating the metering head across said metering means, a diaphragm or analogous pressure-responsive device operatively connected to said regulating valve, means for communicating fluid under pressure from the primary fuel metering system to said diaphragm including a flow conduit and a valve controlling the flow of fluid through said conduit, and means responsive to the pressure and temperature rise across the supercharger for controlling said latter valve.

23. For use with an engine having an air induction passage provided with a variable speed supercharger and means for metering a primary fuel to the engine under pressure; an auxiliary charge injection system for metering an auxiliary charging fluid to the engine including a flow passage having metering means therein and a valve for regulating the metering head across said metering means, a diaphragm or analogous pressure-responsive device operatively connected to said regulating valve, said diaphragm being subjected in a valve-opening direction to the pressure of unmetered fluid, and means for subjecting said diaphragm in a valve-closing direction to a pressure variable in relation to the pressure rise across the supercharger.

24. The invention claimed in claim 23, wherein said last-named means includes a conduit for communicating unmetered primary fuel to said diaphragm and a valve responsive to the pressure and temperature rise across the supercharger controlling flow through said conduit, and means is provided for bleeding a constant amount of fuel from said conduit posterior said latter valve into the metered auxiliary fluid flowing to the engine.

25. For use with an engine having a supercharging system of a capacity variable relative to engine speed, a metering device for supplying a supplementary anti-detonating fluid to the engine in predetermined ratio to the fuel supply to the engine, and means adapted to respond to a change in the capacity of the supercharging system for varying the said ratio.

STANLEY B. SMITH.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,295,656 | Hersey et al. | Sept. 15, 1942 |
| 2,392,565 | Anderson et al. | Jan. 8, 1946 |
| 2,397,984 | Schorn | Apr. 9, 1946 |

Certificate of Correction

Patent No. 2,431,590. November 25, 1947.

STANLEY B. SMITH

It is hereby certified that errors appear in the printed specification of the above numbered patent requiring correction as follows:

Column 1, line 30, for the word "through" read *throughout*; column 3, line 55, for "hence" read *thence*; column 4, line 68, for the reference numeral "47" read *57*; column 5, line 7, for "composition" read *compensation*; column 13, lines 2 and 3, for "supporting" read *supplying*; line 32, for "mult-speed" read *multi-speed*;

and that the said Letters Patent should be read with these corrections therein that the same may conform to the record of the case in the Patent Office.

Signed and sealed this 7th day of December, A. D. 1948.

[SEAL]

THOMAS F. MURPHY,
*Assistant Commissioner of Patents.*